United States Patent
Lee et al.

(10) Patent No.: US 10,085,037 B2
(45) Date of Patent: *Sep. 25, 2018

(54) METHOD AND APPARATUS FOR IMAGE ENCODING AND DECODING USING INTRA PREDICTION

(71) Applicant: SAMSUNG ELECTRONICS CO., LTD., Suwon-si (KR)

(72) Inventors: Tammy Lee, Seoul (KR); Jianle Chen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,992

(22) Filed: May 28, 2015

(65) Prior Publication Data
US 2015/0264379 A1 Sep. 17, 2015

Related U.S. Application Data

(63) Continuation of application No. 14/130,095, filed as application No. PCT/KR2012/005148 on Jun. 28, 2012.
(Continued)

(51) Int. Cl.
*H04N 19/51* (2014.01)
*H04N 19/13* (2014.01)
(Continued)

(52) U.S. Cl.
CPC .............. *H04N 19/52* (2014.11); *H04N 19/13* (2014.11); *H04N 19/51* (2014.11);
(Continued)

(58) Field of Classification Search
CPC ........... H04N 19/593; H04N 19/00696; H04N 19/96; H04N 19/13; H04N 19/52;
(Continued)

(56) References Cited

U.S. PATENT DOCUMENTS 7,995,654 B2   8/2011   Boon et al.
8,149,910 B2   4/2012   Tanizawa et al.
(Continued)

FOREIGN PATENT DOCUMENTS

CN   1198288 A   11/1998
CN   1492688 A   4/2004
(Continued)

OTHER PUBLICATIONS

Communication dated Jun. 16, 2015 issued by the Korean Intellectual Property Office in counterpart Korean Patent Application No. 10-2015-0054497.
(Continued)

*Primary Examiner* — Christopher S Kelley
*Assistant Examiner* — Matthew Kwan
(74) *Attorney, Agent, or Firm* — Sughrue Mion, PLLC

(57) ABSTRACT

Provided are a method and apparatus for intra predicting an image, which generate a prediction value via linear interpolation in horizontal and vertical directions of a current prediction unit. The method includes: generating first and second virtual pixels by using at least one adjacent pixel located upper right and lower left to a current prediction unit; obtaining a first prediction value of a current pixel via linear interpolation using an adjacent left pixel located on the same line as the first virtual pixel and the current pixel; obtaining a second prediction value of the current pixel via linear interpolation using an adjacent upper pixel located on the same column as the second virtual pixel and the current pixel; and obtaining a prediction value of the current pixel by using the first and second prediction values.

4 Claims, 20 Drawing Sheets

Related U.S. Application Data

(60) Provisional application No. 61/501,969, filed on Jun. 28, 2011.

(51) Int. Cl.
*H04N 19/61* (2014.01)
*H04N 19/91* (2014.01)
*H04N 19/52* (2014.01)
*H04N 19/593* (2014.01)
*H04N 19/82* (2014.01)
*H04N 19/96* (2014.01)

(52) U.S. Cl.
CPC ........... *H04N 19/593* (2014.11); *H04N 19/61* (2014.11); *H04N 19/82* (2014.11); *H04N 19/91* (2014.11); *H04N 19/96* (2014.11)

(58) Field of Classification Search
CPC ........ H04N 19/61; H04N 19/91; H04N 19/82; H04N 19/51
USPC ........................................ 375/240.12, 240.14
See application file for complete search history.

(56) References Cited

U.S. PATENT DOCUMENTS

| | | | |
|---|---|---|---|
| 2003/0223645 | A1* | 12/2003 | Sun ....................... H04N 19/197 382/239 |
| 2004/0233989 | A1 | 11/2004 | Kobayashi et al. |
| 2005/0062885 | A1 | 3/2005 | Kadono et al. |
| 2005/0089235 | A1 | 4/2005 | Sakaguchi et al. |
| 2007/0053433 | A1 | 3/2007 | Song |
| 2007/0077023 | A1 | 4/2007 | Okuyama |
| 2008/0025411 | A1 | 1/2008 | Chen et al. |
| 2008/0069232 | A1 | 3/2008 | Kondo et al. |
| 2008/0159399 | A1 | 7/2008 | Gong et al. |
| 2010/0086029 | A1* | 4/2010 | Chen .................... H04N 19/176 375/240.12 |
| 2010/0086209 | A1 | 4/2010 | Lapstun |
| 2010/0322309 | A1* | 12/2010 | Huang .................. H04N 19/895 375/240.12 |
| 2011/0038412 | A1 | 2/2011 | Jung et al. |
| 2011/0038414 | A1 | 2/2011 | Song et al. |
| 2011/0038415 | A1 | 2/2011 | Min et al. |
| 2011/0096829 | A1 | 4/2011 | Han et al. |
| 2011/0293001 | A1* | 12/2011 | Lim ......................... G06K 9/36 375/240.12 |
| 2012/0014438 | A1* | 1/2012 | Segall ............. H04N 19/00927 375/240.12 |
| 2012/0033736 | A1 | 2/2012 | Sato |
| 2012/0140824 | A1 | 6/2012 | Min et al. |
| 2014/0133557 | A1 | 5/2014 | Boon et al. |

FOREIGN PATENT DOCUMENTS

| | | |
|---|---|---|
| CN | 1535027 A | 10/2004 |
| CN | 1585495 A | 2/2005 |
| CN | 1589028 A | 3/2005 |
| CN | 1662066 A | 8/2005 |
| CN | 1674680 A | 9/2005 |
| CN | 101217669 A | 7/2008 |
| CN | 101361370 A | 2/2009 |
| EP | 0895424 A2 | 2/1999 |
| EP | 1 429 564 A1 | 6/2004 |
| EP | 2391129 A1 | 11/2011 |
| KR | 10-2011-0017783 A | 2/2011 |
| KR | 10-2011-0018189 A | 2/2011 |
| KR | 10-2011-0036401 A | 4/2011 |
| KR | 10-2011-0044487 A | 4/2011 |
| RU | 2386222 C2 | 4/2010 |
| TW | I325281 B | 5/2010 |
| TW | I327866 B | 7/2010 |
| TW | I331877 B | 10/2010 |
| TW | I334309 B | 12/2010 |
| TW | I552583 B | 10/2016 |
| WO | 2010/123056 A1 | 10/2010 |
| WO | 2011/149265 A2 | 12/2011 |

OTHER PUBLICATIONS

Communication dated Jun. 16, 2015 issued by the Korean Intellectual Property Office in counterpart Korean Patent Application No. 10-2015-0054498.
Communication dated Jun. 16, 2015 issued by the Korean Intellectual Property Office in counterpart Korean Patent Application No. 10-2015-0054499.
Communication dated Jun. 16, 2015 issued by the Korean Intellectual Property Office in counterpart Korean Patent Application No. 10-2015-0054500.
Communication from the Australian Patent Office dated Sep. 10, 2015 in a counterpart Australian Application No. 2012276407.
Communication from the Taiwanese Patent Office dated Nov. 9, 2015 in a counterpart Taiwanese application No. 101123374.
Communication from the Korean Intellectual Property Office dated Sep. 30, 2015 in a counterpart Korean application No. 10-2015-0054498.
Communication from the Korean Intellectual Property Office dated Sep. 30, 2015 in a counterpart Korean application No. 10-2015-0054499.
International Search Report dated Dec. 27, 2012 in International Application No. PCT/KR2012/005148 (PCT/ISA/210).
Written Opinion dated Dec. 27, 2012 in International Application No. PCT/KR2012/005148 (PCT/ISA/237).
Communication dated Dec. 9, 2014, issued by the Japanese Patent Office in counterpart Japanese Application No. 2014-518806.
Communication dated Feb. 12, 2015, issued by the European Patent Office in counterpart European Application No. 12804848.5.
Kanumuri, et al.; "., CE6.e/f: Planar Mode Experiments and Results" Joint Collaborative Team on Video Coding (JCT-VC) of ITU-T SG16 WP3 and ISO/IEC JTC1/SC29/WG11, Mar. 2011, 9 pages total.
Wiegand, et al.; "WD3: Working Draft 3 of High-Efficiency Video Coding", Joint Collaborative Team on Video Coding (JCT-VC)of ITU-T SG16 WP3 and ISO/IEC JTC1/SC29/WG11, Mar. 2011, 214 pages total.
Chen, et al.; "Planar Intra Prediction Improvement", Joint Collaborative Team on Video Coding (JCT-VC) of ITU-T SG16 WP3 and ISO/IEC JTC1/SC29/WG11, Jul. 2011, 5 pages total.
Bici, et al.; "Unified Planar Intra Prediction", Joint Collaborative Team on Video Coding (JCT-VC)of ITU-T SG16 WP3 and ISO/IEC JTC1/SC29/WG11, Mar. 2011, 5 pages total.
Bross, et al; "WD4: Working Draft 4 of High-Efficiency Video Coding", Joint Collaborative Team on Video Coding (JCT-VC)of ITU-T SG16 WP3 and ISO/IEC JTC1/SC29/WG11, Jul. 2011, 230 pages total.
Kanumuri et al., "Enhancements to Intra Coding", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Doc: JCTV C-D235, 8 pages total.
Communication dated Jan. 12, 2016, issued by the Japanese Patent Office in counterpart Japanese Application No. 2014-518806.
Communication dated Apr. 11, 2016, from the Russian Patent Office in counterpart application No. 2014102592/07.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5th Meeting: Geneva, CH, Mar. 16-23, 2011 Document: JCTVC-E603 (223 Pages Total) (Cited in Cited in RU Comm. Apr. 11, 2016 in 2014102592/07 and Cited in CN Comm. Jun. 27, 2016 in 201280042446.X.).
Communication dated Jun. 27, 2016, from the State Intellectual Property Office of People's Republic of China in counterpart Application No. 201280042446.X.
First Office Action dated Feb. 20, 2017 issued by Taiwanese Intellectual Property Office in counterpart Taiwanese Application No. 105126165.

(56) References Cited

OTHER PUBLICATIONS

Decision on Grant dated Mar. 24, 2017 issued by Russian Intellectual Property Office in counterpart Russian Application No. 2016127510/07.
Second Office Action dated May 1, 2017 issued by Canadian Intellectual Property Office in counterpart Canadian Application No. 2,840,486.
Communication issued by the State Intellectual Property Office of P.R. China dated Aug. 3, 2017 in counterpart Chinese Patent Application No. 201510237934.1.
Communication issued by the State Intellectual Property Office of P.R. China dated Sep. 4, 2017 in counterpart Chinese Patent Application No. 201510450555.0.
Communication issued by the State Intellectual Property Office of P.R. China dated Sep. 18, 2017 in counterpart Chinese Patent Application No. 201510452250.3.
Communication issued by the State Intellectual Property Office of P.R. China dated Aug. 18, 2017 in counterpart Chinese Patent Application No. 201510449585.X.
Communication dated May 3, 2018 from the Russian Patent Office in counterpart application No. 2017124656/07.
Communication dated Apr. 23, 2018, from the State Intellectual Property Office of People's Republic of China in counterpart Application No. 201510449585.X.

\* cited by examiner

FIG. 7
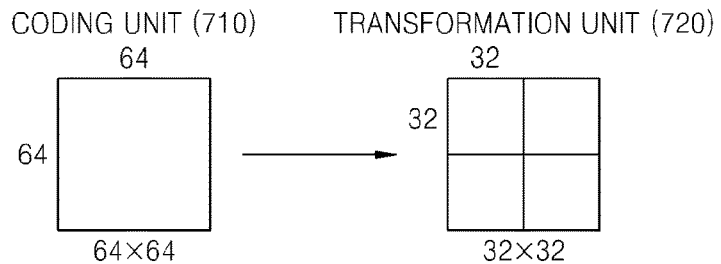
FIG. 8
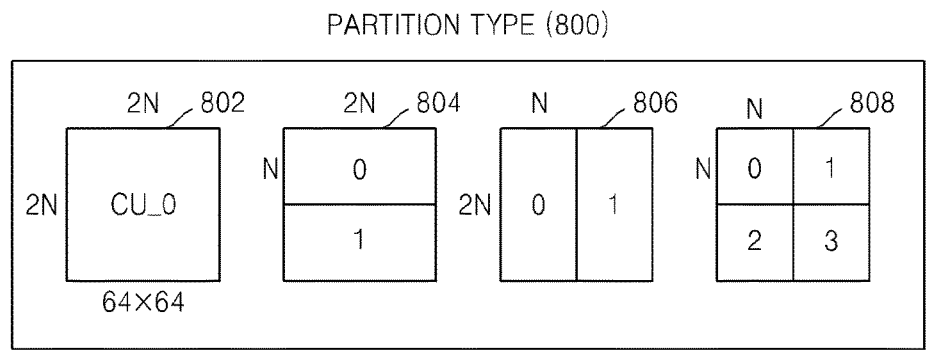
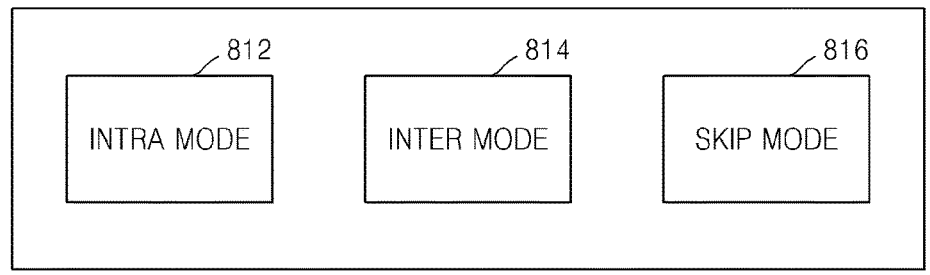
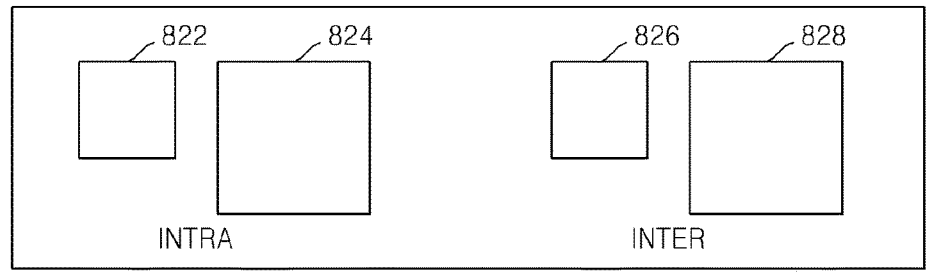

CODING UNIT (1010)

PREDICTION UNIT (1060)

FIG. 14

| SIZE OF CODING UNIT | NUMBER OF PREDICTION MODES | | |
|---|---|---|---|
| | Example 1 | Example 2 | Example 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

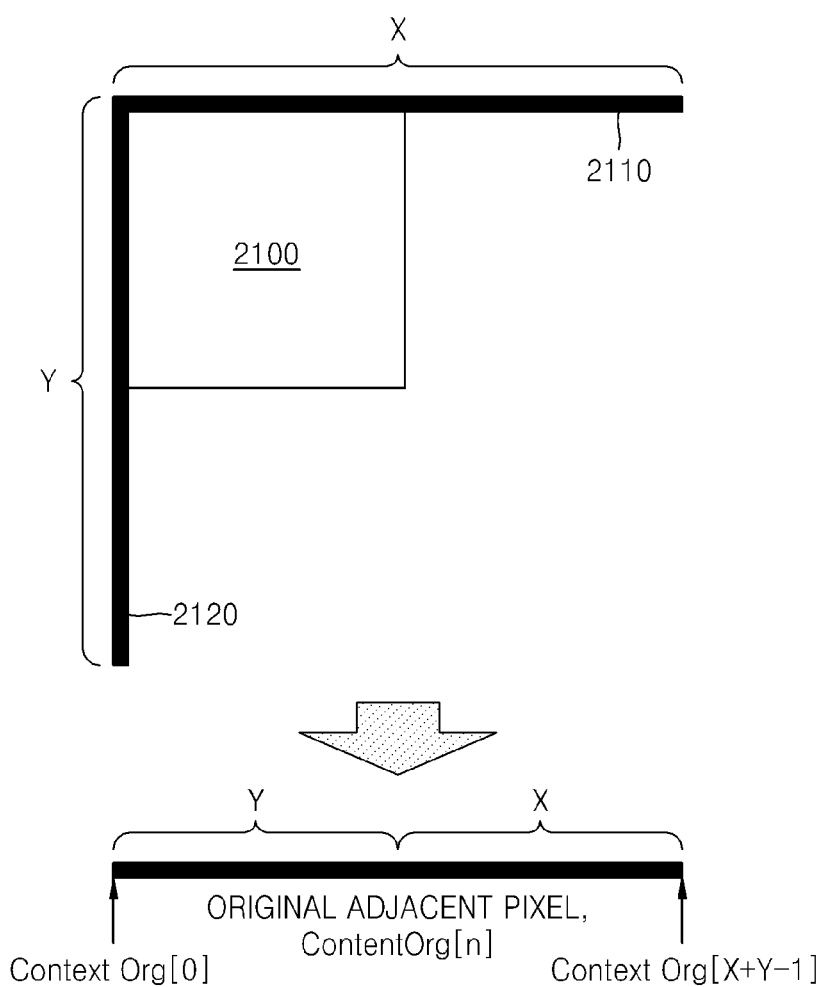

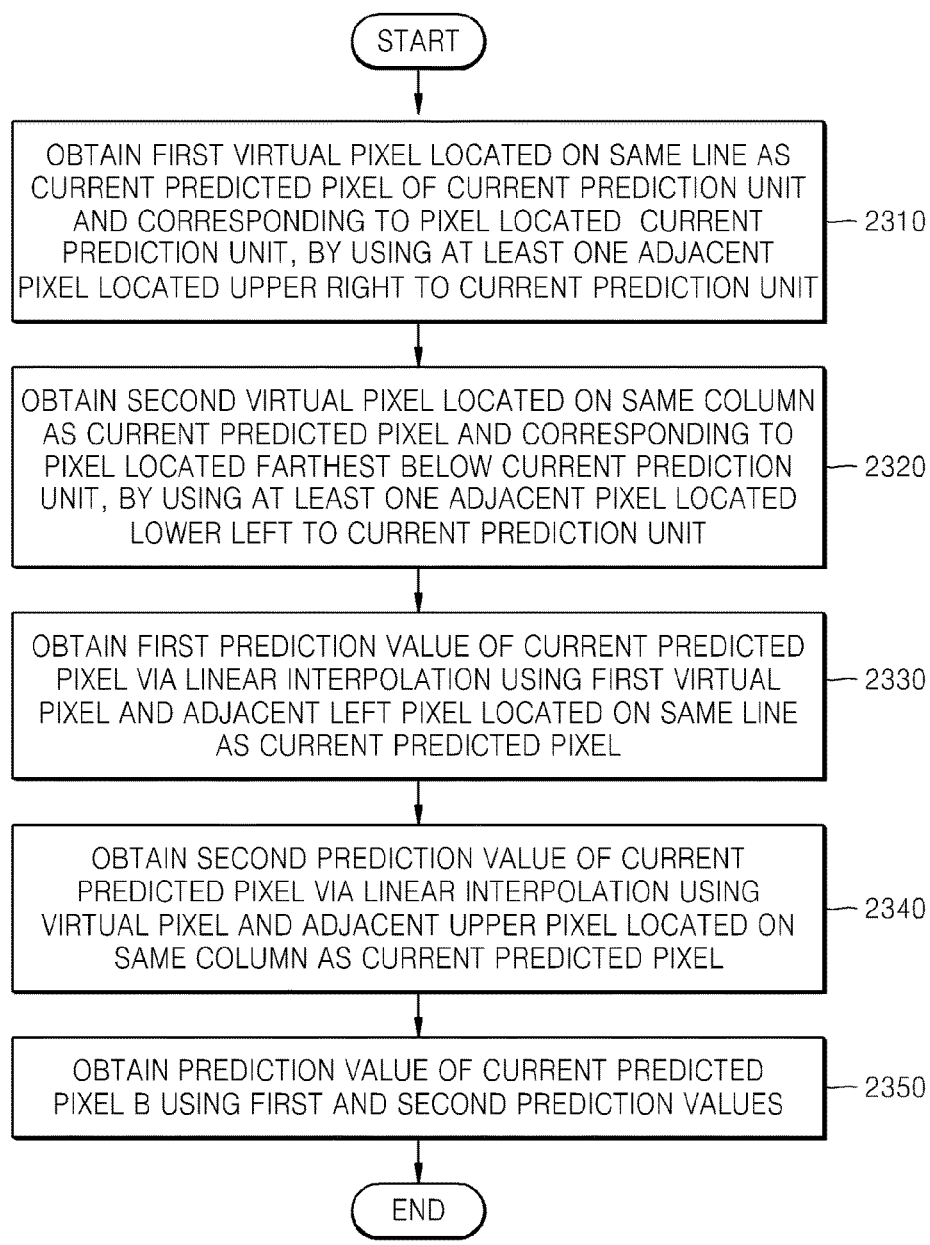

METHOD AND APPARATUS FOR IMAGE ENCODING AND DECODING USING INTRA PREDICTION

CROSS-REFERENCE TO RELATED APPLICATIONS

This is a Continuation application of U.S. application Ser. No. 14/130,095 filed Jan. 31, 2014, which is a National Stage application under 35 U.S.C. § 371 of PCT/KR2012/005148, filed on Jun. 28, 2012, which claims the benefit of U.S. Provisional Application No. 61/501,969, filed on Jun. 28, 2011, all the disclosures of which are incorporated herein in their entireties by reference.

BACKGROUND

1. Field

Apparatuses and methods consistent with exemplary embodiments relate to encoding and decoding of an image, and more particularly, to intra prediction encoding and intra prediction decoding of an image, wherein compression efficiency of an image is improved by using various directivities and a new intra prediction mode.

2. Description of the Related Art

In an image compression method, such as Moving Picture Experts Group (MPEG)-1, MPEG-2, MPEG-4, or H.264/MPEG-4 Advanced Video Coding (AVC), a picture is divided into macroblocks in order to encode an image. Each of the macroblocks is encoded in all encoding modes that can be used in inter prediction or intra prediction, and then is encoded in an encoding mode that is selected according to a bit rate used to encode the macroblock and a distortion degree of a decoded macroblock based on the original macroblock.

As hardware for reproducing and storing high resolution or high quality video content is being developed and supplied, there is an increasing need for a video codec capable of effectively encoding or decoding the high resolution or high quality video content. In a related art video codec, a video is encoded in units of macroblocks each having a predetermined size.

SUMMARY

Aspects of one or more exemplary embodiments provide methods and apparatuses for intra prediction encoding and intra prediction decoding of an image, wherein coding efficiency is improved according to an image characteristic via a new intra prediction method using pixels adjacent to a current prediction unit.

Aspects of one or more exemplary embodiments also provide a new intra prediction mode using pixels adjacent to a current prediction unit.

According to aspects of one or more exemplary embodiments, encoding efficiency of an image can be improved by applying an optimum intra prediction method according to image characteristics via various intra prediction methods using adjacent pixels.

According to an aspect of an exemplary embodiment, there is provided a method of intra predicting an image, the method including: obtaining a first virtual pixel located on a same line as a current predicted pixel of a current prediction unit while corresponding to a pixel located farthest right of the current prediction unit, by using at least one adjacent pixel located upper right to the current prediction unit; obtaining a second virtual pixel located on a same column as the current predicted pixel while corresponding to a pixel located farthest below the current prediction unit, by using at least one adjacent pixel located lower left to the current prediction unit; obtaining a first prediction value of the current predicted pixel via linear interpolation using the first virtual pixel and an adjacent left pixel on the same line as the current predicted pixel; obtaining a second prediction value of the current predicted pixel via linear interpolation using the second virtual pixel and an adjacent upper pixel on the same column as the current predicted pixel; and obtaining a prediction value of the current predicted pixel by using the first and second prediction values.

According to an aspect of another exemplary embodiment, there is provided an apparatus for intra predicting an image, the apparatus including: an intra predictor configured to obtain a first virtual pixel located on a same line as a current predicted pixel of a current prediction unit while corresponding to a pixel located farthest right of the current prediction unit, by using at least one adjacent pixel located upper right to the current prediction unit, to obtain a second virtual pixel located on a same column as the current predicted pixel while corresponding to a pixel located farthest below the current prediction unit, by using at least one adjacent pixel located lower left to the current prediction unit, to obtain a first prediction value of the current predicted pixel via linear interpolation using the first virtual pixel and an adjacent left pixel on the same line as the current predicted pixel, to obtain a second prediction value of the current predicted pixel via linear interpolation using the second virtual pixel and an adjacent upper pixel on the same column as the current predicted pixel, and to obtain a prediction value of the current predicted pixel by using the first and second prediction values.

DESCRIPTION OF DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 14 is a table showing a number of intra prediction modes according to a size of a prediction unit, according to an exemplary embodiment;

FIG. 21 is a diagram showing adjacent pixels that are filtered around a current prediction unit, according to an exemplary embodiment;

FIG. 23 is a flowchart illustrating an intra prediction method according to a planar mode, according to an exemplary embodiment.

DETAILED DESCRIPTION OF EXEMPLARY EMBODIMENTS

Figure 1:
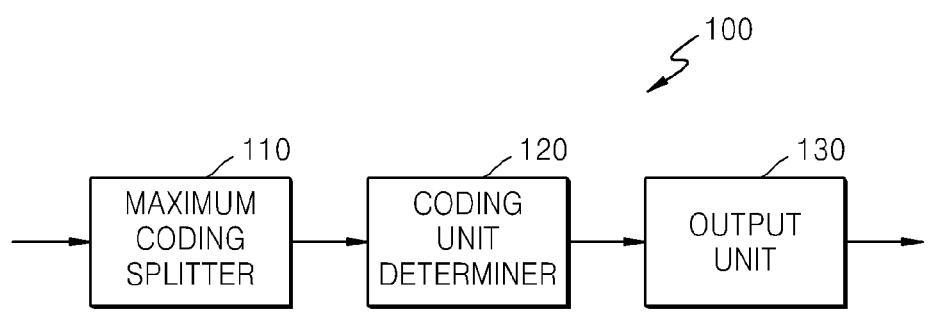
FIG. 1 is a block diagram of an apparatus for encoding a video, according to an exemplary embodiment.

Hereinafter, exemplary embodiments will be described more fully with reference to the accompanying drawings, in which like reference numerals refer to like elements throughout.

FIG. 1 is a block diagram of a video encoding apparatus 100, according to an exemplary embodiment.

The video encoding apparatus 100 includes a maximum coding unit splitter 110, a coding unit determiner 120, and an output unit 130 (e.g., outputter).

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is thus N×N, and may be 2 when the size of the transformation unit is thus N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit may be a maximum square data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
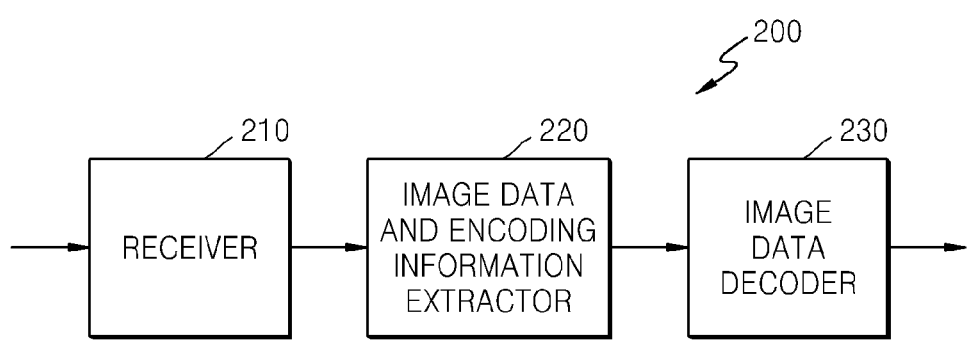
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
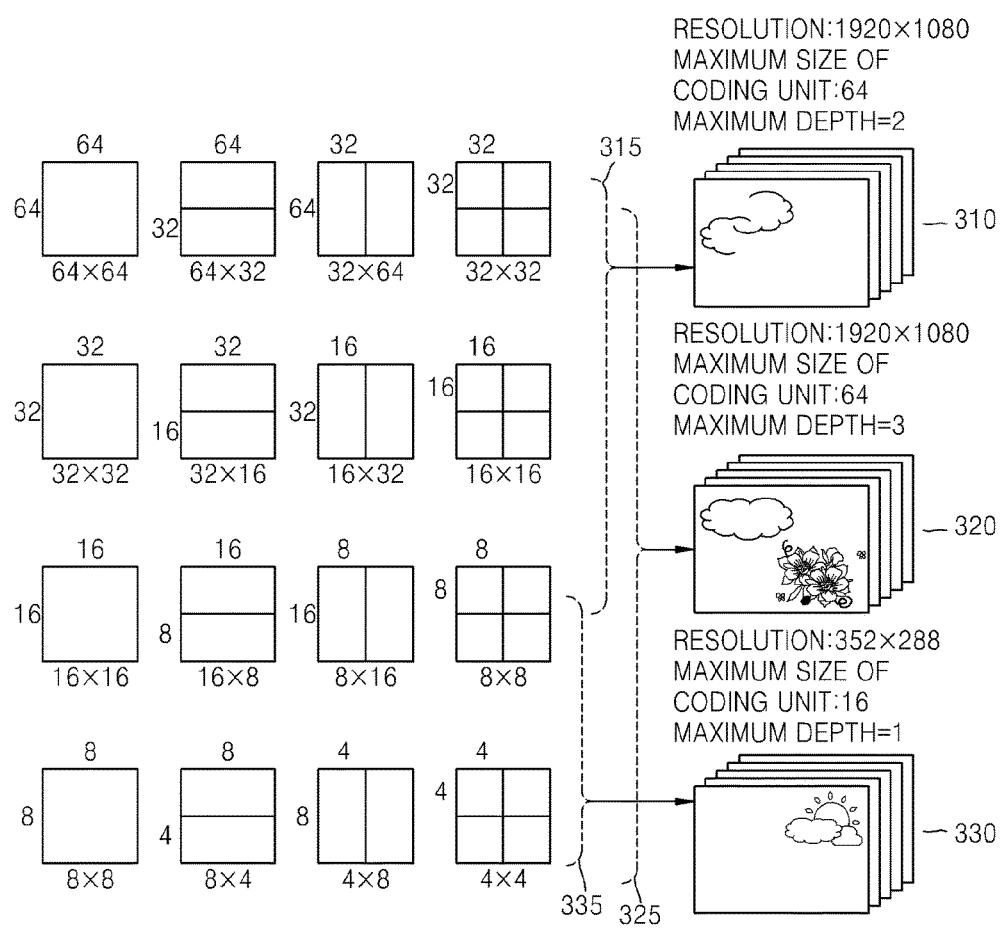
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
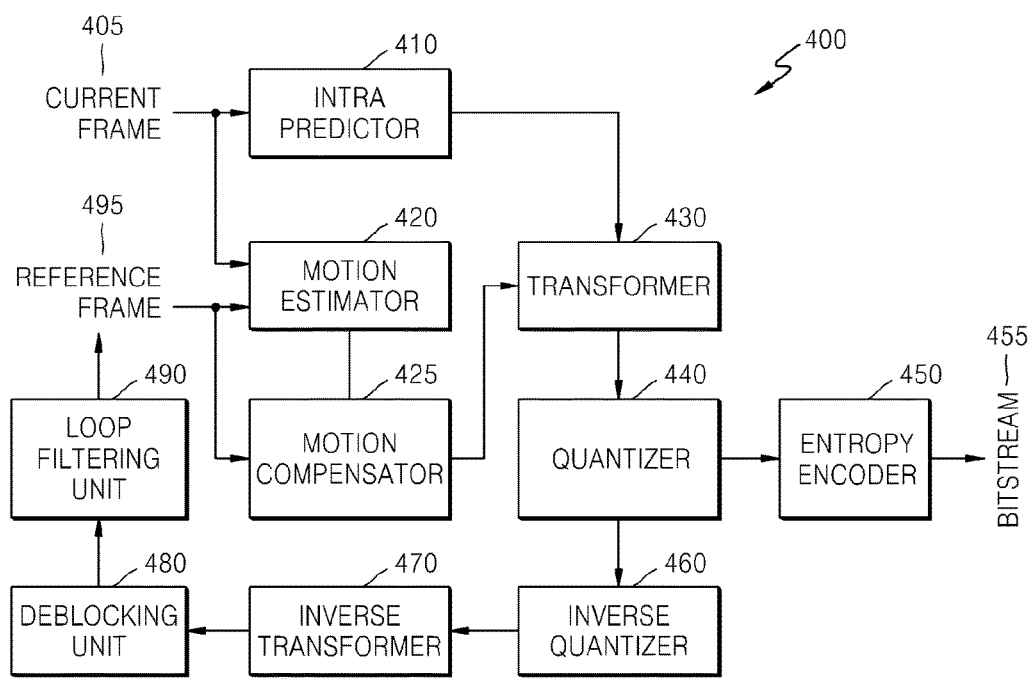
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
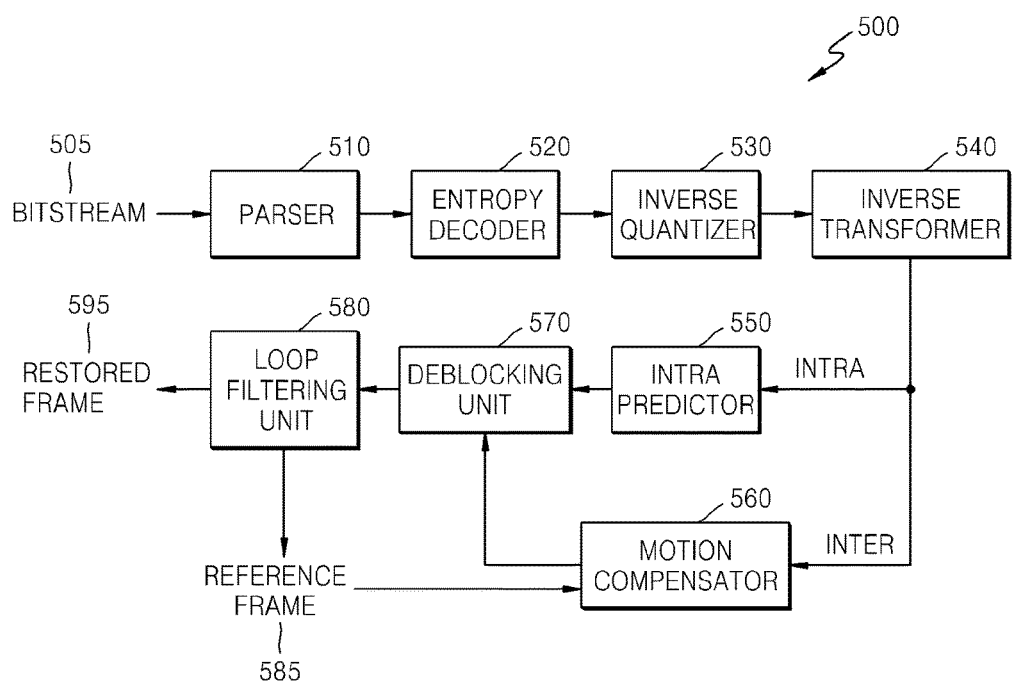
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
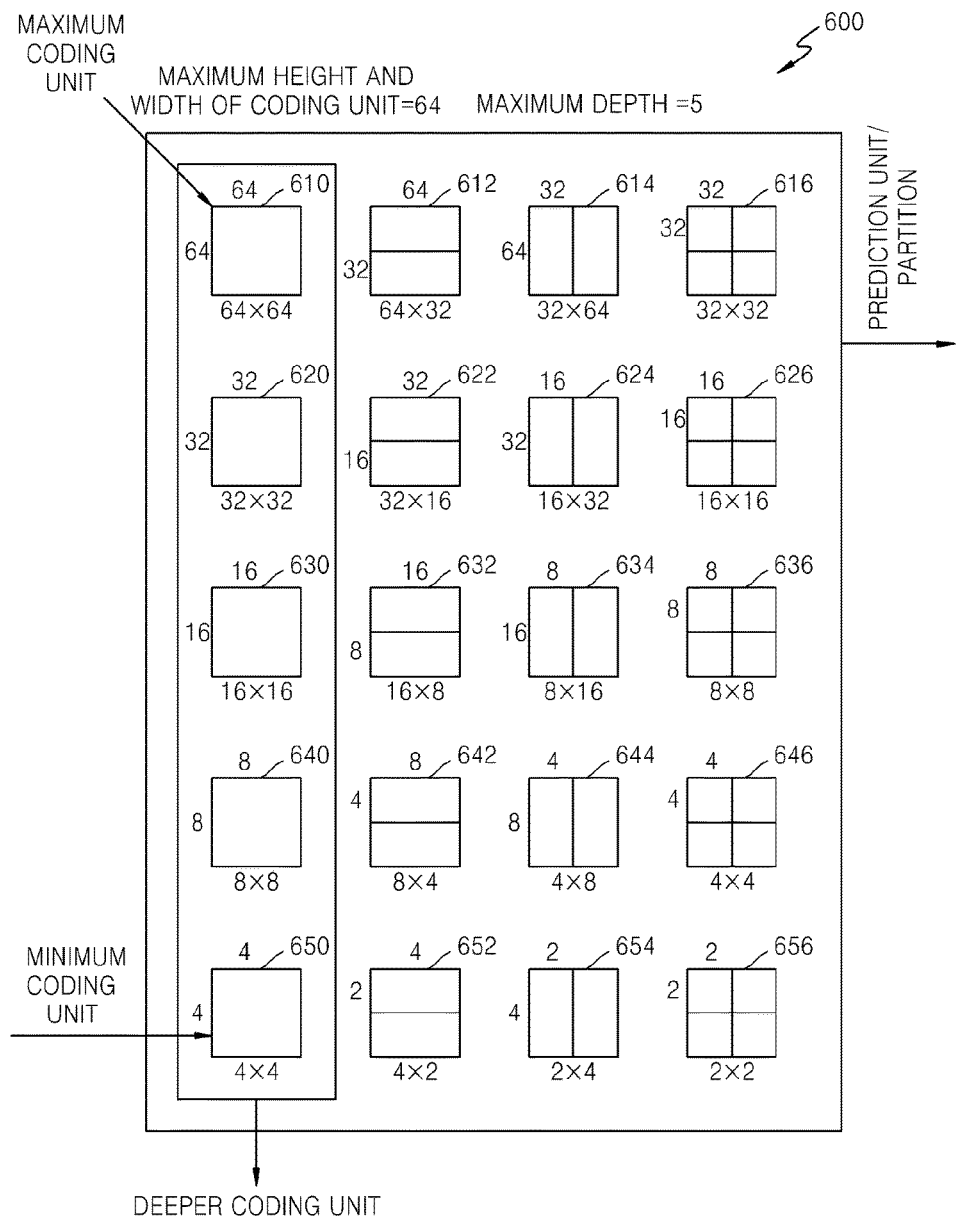
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
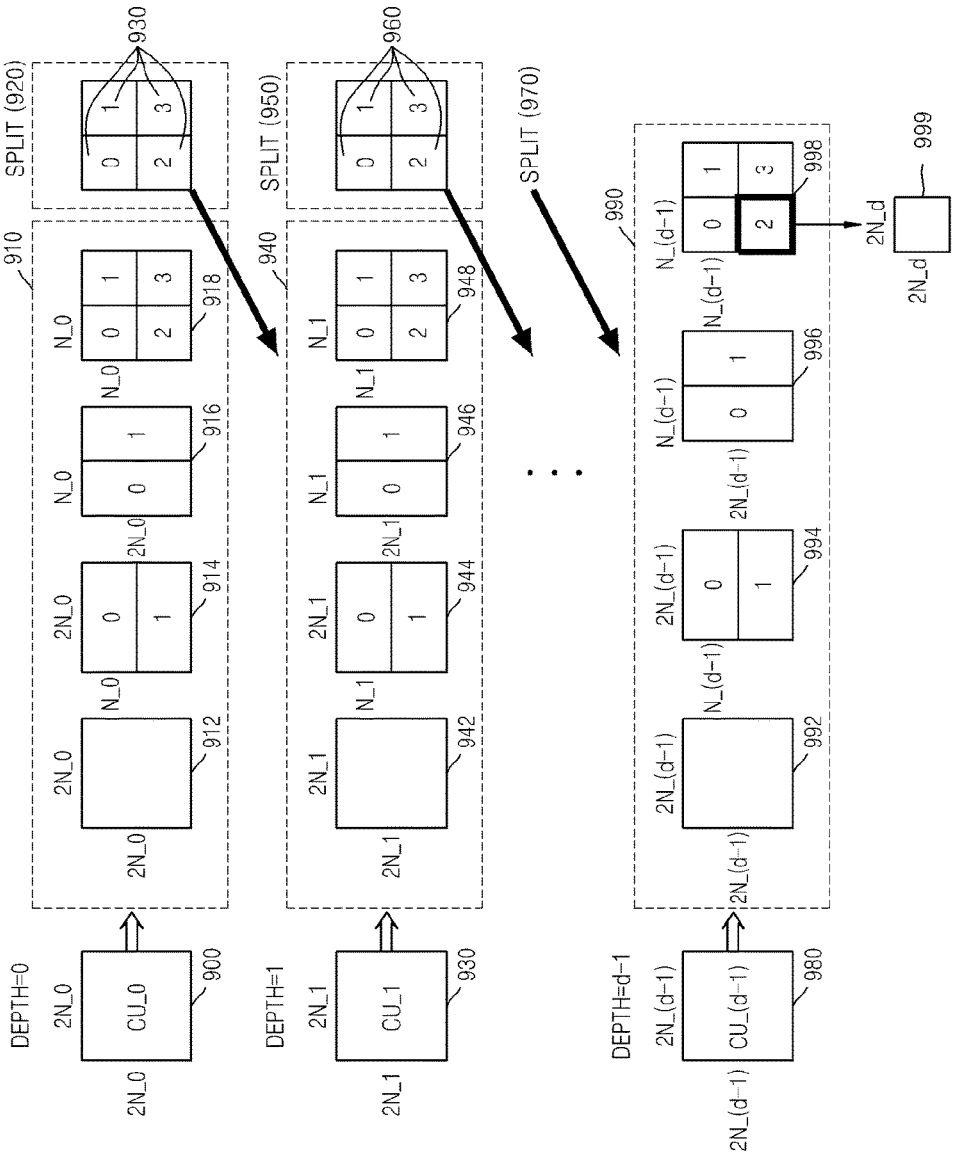
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2Nx2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2Nx2N) | 2Nx2N 2NxN Nx2N NxN | 2NxnU 2NxnD nLx2N nRx2N | 2Nx2N | NxN (Symmetrical Type) N/2xN/2 (Asymmetrical Type) | Repeatedly Encode Coding Units having Lower Depth of d + 1 |

Figure 10:
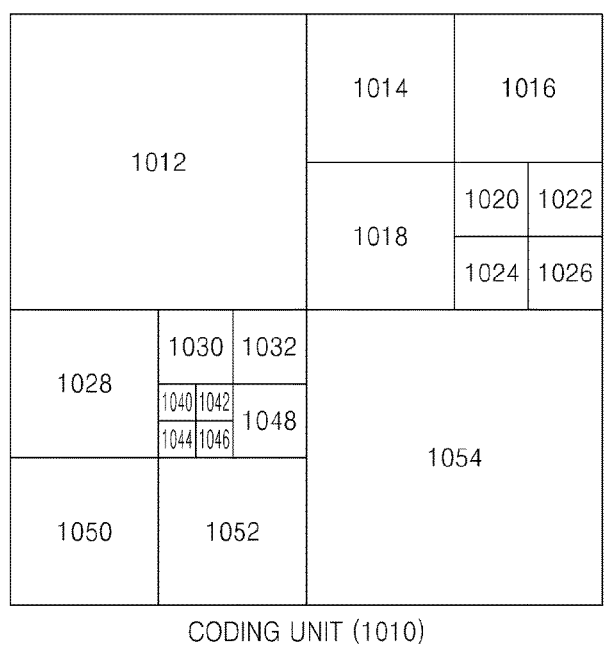
FIGS. 10 through 12 are diagrams for describing a relationship between coding units, prediction units, and transformation units, according to an exemplary embodiment.
Figure 11:
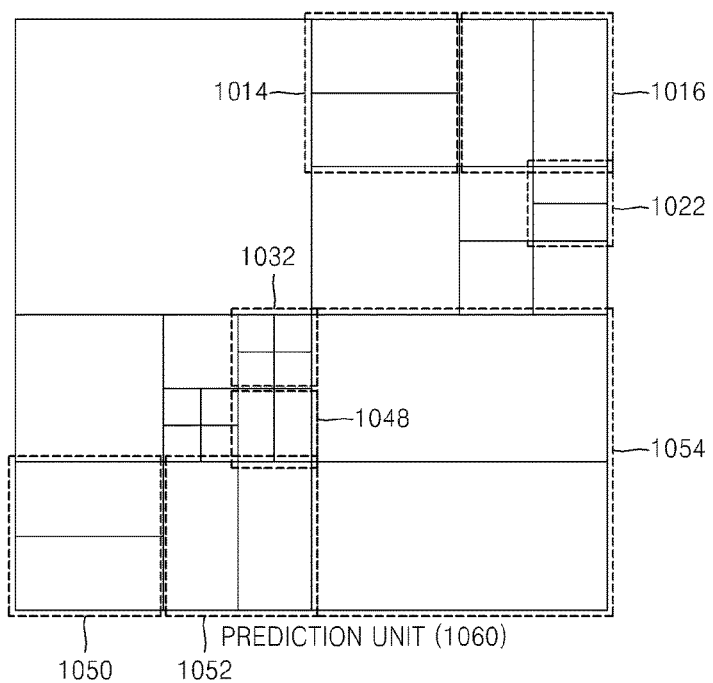
Figure 12:
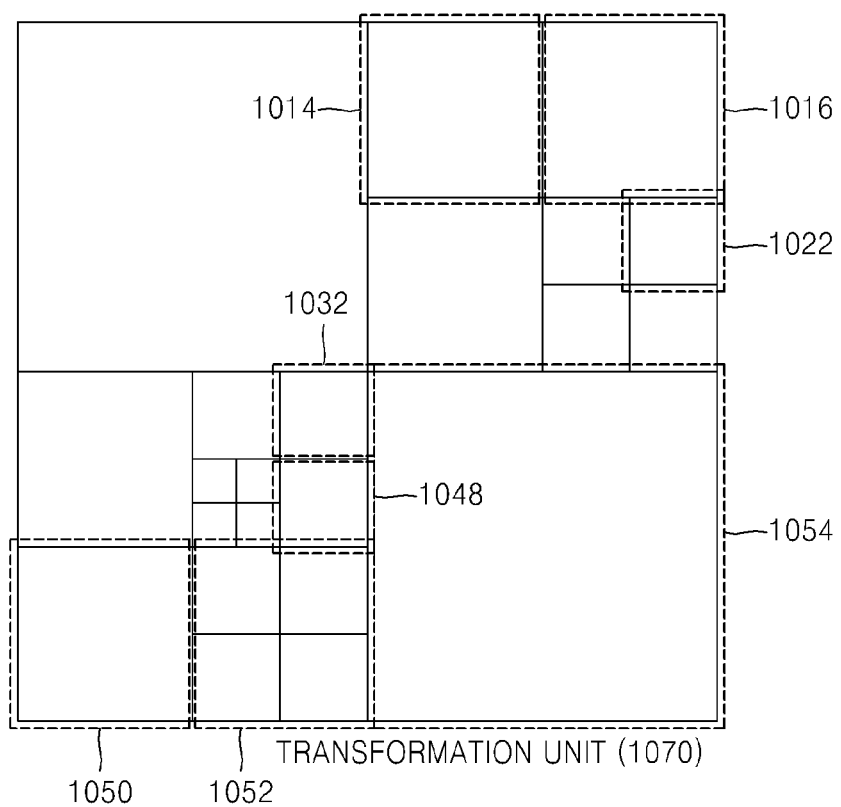

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2NxN, partition types in the coding units 1016, 1048, and 1052 have a size of Nx2N, and a partition type of the coding unit 1032 has a size of NxN. Prediction units and partitions of the coding units 1010 are smaller than or equal to each coding unit.

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2Nx2N.

The information about the partition type may indicate symmetrical partition types having sizes of 2Nx2N, 2NxN, Nx2N, and NxN, which are obtained by symmetrically splitting a height or a width of a prediction unit, and asymmetrical partition types having sizes of 2NxnU, 2NxnD, nLx2N, and nRx2N, which are obtained by asymmetrically splitting the height or width of the prediction unit.

The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
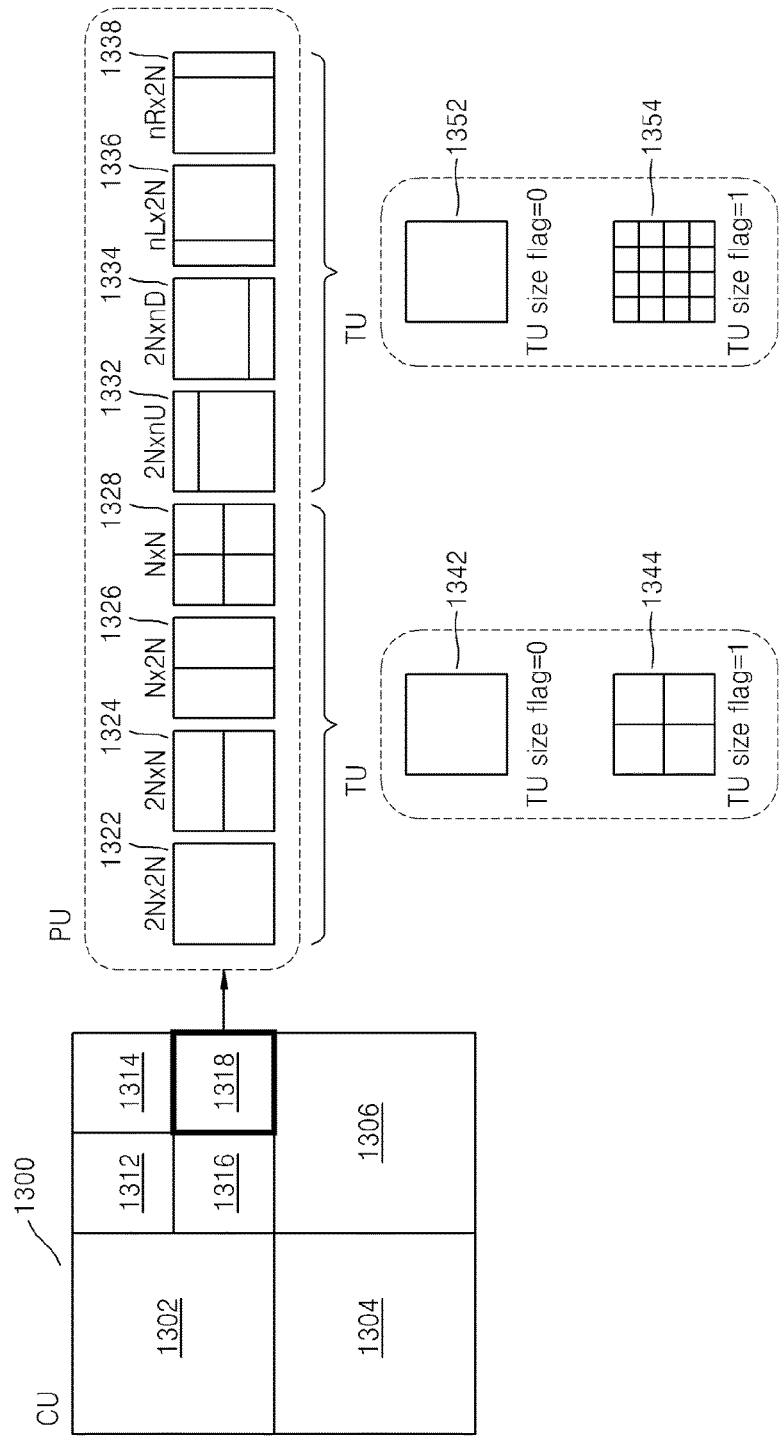
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, intra prediction performed on a prediction unit by the intra predictor 410 of the video encoding apparatus 100 of FIG. 4 and the intra predictor 550 of the video decoding apparatus 200 of FIG. 5 will be described in detail.

The intra predictors 410 and 550 perform intra prediction for obtaining a prediction value of a current prediction unit by using adjacent pixels of the current prediction unit. Considering that a prediction unit has a size equal to or higher than 16×16, the intra predictors 410 and 550 additionally performs an intra prediction mode having various directivities using a (dx, dy) parameter as well as an intra prediction mode having a limited directivity according to a related art. The intra prediction mode having various directivities according to an exemplary embodiment will be described later in detail.

Also, in order to obtain a predictor of a current pixel, the intra predictors 410 and 550 may generate a predictor P1 via linear interpolation in a horizontal direction of a current pixel and a predictor P2 via linear interpolation in a vertical direction of the current pixel, and use an average value of the predictors P1 and P2 as a predictor of the current pixel. An intra prediction mode for generating a predictor of a current pixel by combining predictors obtained via linear interpolation in a horizontal direction and linear interpolation in a vertical direction is defined as a planar mode. Specifically, the intra predictors 410 and 550 generate a virtual pixel used in linear interpolation in a horizontal direction by using at least one adjacent pixel located upper right to a current prediction unit and a virtual pixel used in linear interpolation in a vertical direction by using at least one adjacent pixel located lower left to the current prediction unit in a planar mode. The planar mode according to an exemplary embodiment will be described in detail later.

FIG. 14 is a table showing a number of intra prediction modes according to a size of a prediction unit, according to an exemplary embodiment.

The intra predictors 410 and 550 may variously set the number of intra prediction modes to be applied to the prediction unit according to the size of the prediction unit. For example, referring to FIG. 14, when the size of the prediction unit to be intra predicted is N×N, the numbers of intra prediction modes actually performed on the prediction units having the sizes of 2×2, 4×4, 8×8, 16×16, 32×32, 64×64, and 128×128 may be respectively set to 5, 9, 9, 17, 33, 5, and 5 in Example 2. The number of intra prediction modes actually performed differs according to the size of the prediction unit because overhead for encoding prediction mode information differs according to the size of the prediction unit. In other words, even though a portion of a prediction unit occupying an entire image is small, overhead for transmitting additional information, such as a prediction mode of such a small prediction unit may be large. Accordingly, when a prediction unit having a small size is encoded in many prediction modes, an amount of bits may increase and thus compression efficiency may decrease. Also, since a prediction unit having a large size, for example, a prediction unit having a size equal to or larger than 64×64, is generally mostly selected as a prediction unit of a flat region of an image, it may be insufficient in terms of compression efficiency to encode the prediction unit having a large size, which is mostly selected to encode a flat region, in many prediction modes. Accordingly, when a size of prediction unit is too large or too small compared to a predetermined size, a relatively small number of intra prediction modes may be applied. However, the number of intra prediction modes applied according to the size of a prediction unit is not limited to FIG. 14, and may vary. The number of intra prediction modes applied according to the size of a prediction unit, as shown in FIG. 14, is only an example, and may vary. Alternatively, the number of intra prediction modes applied to the prediction unit may be always uniform regardless of the size of a prediction unit.

The intra predictors 410 and 550 may include, as an intra prediction mode applied to a prediction unit, an intra prediction mode that determines an adjacent reference pixel by using a line having a predetermined angle based on a pixel in a prediction unit and using the determined adjacent reference pixel as a predictor of the pixel. The angle of such a line may be set by using a parameter (dx, dy), wherein dx and dy are each an integer. For example, when 33 prediction modes are respectively defined to be modes N, wherein N is an integer from 0 to 32, a mode 0 is set to a vertical mode, a mode 1 is set to a horizontal mode, a mode 2 is set to a DC mode, a mode 3 is set to a plane mode, and a mode 32 is set to a planar mode. Also, modes 4 through 31 may be defined to be intra prediction modes determining an adjacent reference pixel by using a line having a directivity of tan−1(dy/dx) using (dx, dy) respectively expressed by (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) of Table 1, and using the determined adjacent reference pixel for intra prediction.

TABLE 2

| mode # | dx | dy |
|---|---|---|
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 | mode 0 is vertical mode, mode 1 is horizontal mode, mode 2 is DC mode, mode 3 is plane mode, and mode 32 is planar mode.

The number of intra prediction modes used by the intra predictors 410 and 550 is not limited to Table 2, and may vary based on whether a current prediction unit is a chrominance component or luminance component or based on a size of current prediction unit. Also, each mode N may denote an intra prediction mode different from above. For example, the number of intra prediction modes may be 36, wherein a mode 0 is a planar mode described later, a mode 1 is a DC mode, modes 2 through 34 are intra prediction modes having 33 directivities as described later, and a mode 35 is an intra prediction mode Intra_FromLuma using a prediction unit in a luminance component corresponding to a prediction unit in a chrominance component. The mode 35, i.e., the intra prediction mode Intra_FromLuma using the prediction unit in the luminance component corresponding to the prediction unit in the chrominance component is only applied to the prediction unit in the chrominance component, and is not used to intra predict the prediction unit in the luminance component.

Figure 15:
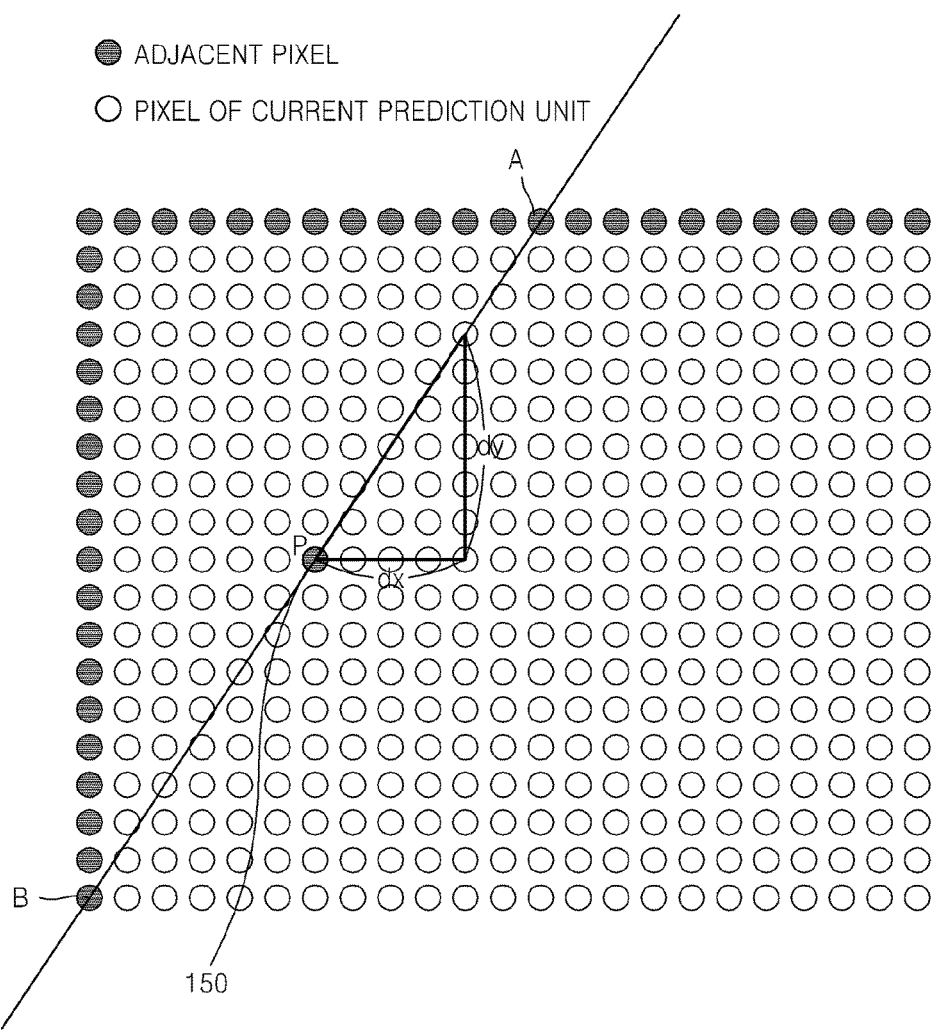
FIG. 15 is a reference diagram for describing intra prediction modes having various directivities, according to an exemplary embodiment.

FIG. 15 is a reference diagram for describing intra prediction modes having various directivities, according to an exemplary embodiment.

As described above, the intra predictors 410 and 550 may determine an adjacent reference pixel by using a line having an angle of tan$^{-1}$(dy/dx) determined by a plurality of (dx, dy) parameters, and perform intra prediction by using the determined adjacent reference pixel.

Referring to FIG. 15, adjacent pixels A and B located on an extension line 150 having an angle of tan$^{-1}$(dy/dx) determined according to a value of (dx, dy) according to the intra prediction modes of Table 2 based on a current pixel P to be predicted in a current prediction unit may be used as predictors of the current pixel P. Here, an adjacent pixel used as a predictor may be a pixel of a previous prediction unit that is pre-encoded and pre-restored and is located either above, left, upper right, or lower left of a current prediction unit. As such, by performing prediction encoding according to intra prediction modes having various directivities, compression may be effectively performed according to characteristics of an image.

In FIG. 15, when a predictor of the current pixel P is generated by using an adjacent pixel located on or near the extension line 150, the extension line 150 actually has a directivity of tan$^{-1}$(dy/dx) and a division of (dy/dx) is required to determine the adjacent pixel using the extension line 150, and thus hardware or software may include a decimal point operation, thereby increasing a throughput. Accordingly, when a prediction direction for selecting a reference pixel is set by using (dx, dy) parameters, dx and dy may be set to decrease a throughput.

Figure 16:
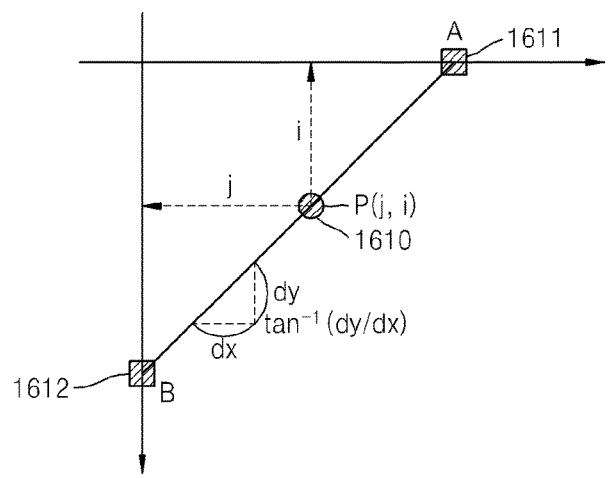
FIG. 16 is a diagram for describing a relationship between a current pixel and adjacent pixels disposed on an extension line having a directivity of (dx, dy), according to an exemplary embodiment.

FIG. 16 is a diagram for describing a relationship between a current pixel and adjacent pixels disposed on an extension line having a directivity of (dx, dy), according to an exemplary embodiment.

Referring to FIG. 16, P 1610 denotes the current pixel located at (j, i) and A 1611 and B 1612 respectively denote an adjacent upper pixel and an adjacent left pixel located on an extension line having a directivity, i.e., an angle of tan$^{-1}$(dy/dx), passing through the current pixel P 1610. It is assumed that a size of a prediction unit including the current pixel P 1610 is nS×nS wherein nS is a positive integer, a location of pixel of the prediction unit is one of (0, 0) to (nS−1, nS−1), a location of the adjacent upper pixel A 1611 on an x-axis is (m, −1) wherein m is an integer, and a location of the adjacent left pixel B 1612 on an y-axis is (−1, n) wherein n is an integer. The location of the adjacent upper pixel A 1611 meeting the extension line passing through the current pixel P1610 is (j+i*dx/dy, −1), and the location of the adjacent left pixel B 1612 is (−1, i+j*dy/dx). Accordingly, in order to determine the adjacent upper pixel A 1611 or adjacent left pixel B 1612 to predict the current pixel P1610, a division operation, such as dx/dy or dy/dx is required. As described above, since operation complexity of the division operation is high, an operation speed in software or hardware may be low. Accordingly, at least one of dx and dy indicating a directivity of a prediction mode for determining an adjacent pixel may be a power of 2. In other words, when n and m are each an integer, dx and dy may be respectively 2^n and 2^m.

When the adjacent left pixel B 1612 is used as a predictor of the current pixel P 1610 and dx has a value of 2^n, an j*dy/dx operation required to determine (−1, i+j*dy/dx), i.e., a location of the adjacent left pixel B 1612, may be (i*dy)/(2^n) and a division operation using a power of 2 may be realized via a shift operation, such as (i*dy)>>n, and thus a throughput is decreased.

Similarly, when the adjacent upper pixel A 1611 is used as a predictor of the current pixel P 1610 and dy has a value of 2^m, an i*dx/dy operation required to determine (j+i*dx/dy,−1), i.e., a location of the adjacent upper pixel A 1611 may be (i*dx)/(2^m) and a division operation using a power of 2 may be realized via a shift operation, such as (i*dx)>>m.

Figure 17:
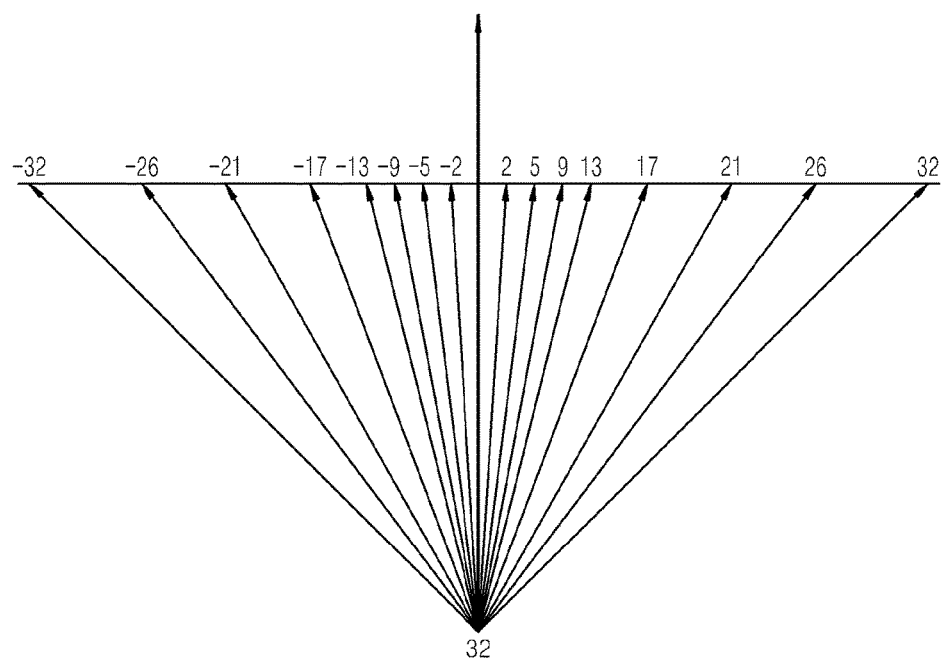
FIGS. 17 and 18 are diagrams showing directions of an intra prediction mode, according to exemplary embodiments.
Figure 18:
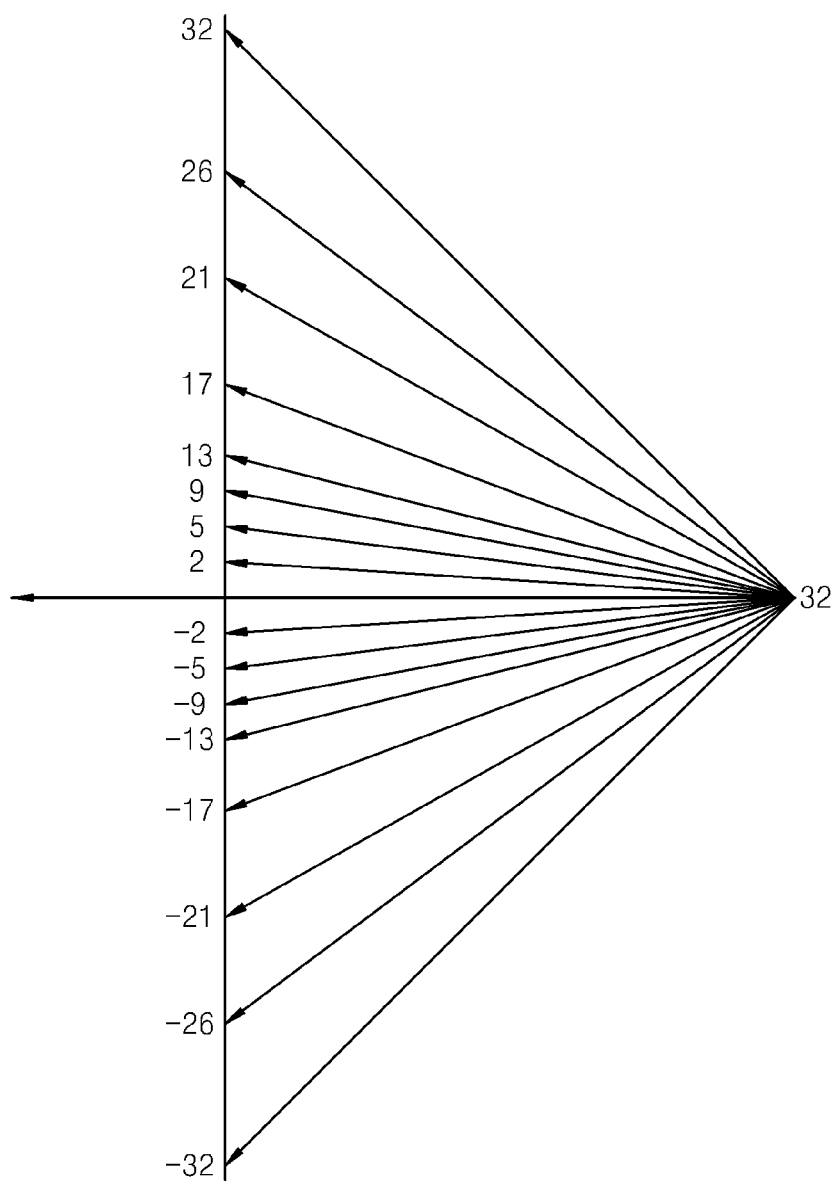

FIGS. 17 and 18 are diagrams showing directions of an intra prediction mode, according to exemplary embodiments.

Generally, straight line patterns shown in an image or video signal are mostly vertical or horizontal. Thus, when an intra prediction mode having various directivities is defined by using a (dx, dy) parameter, values of dx and dy may be defined as follows to improve encoding efficiency of an image.

In detail, when dy has a fixed value of 2^m, an absolute value of dx may be set such that an interval between prediction directions close to a vertical direction is narrow and an interval between prediction modes increases towards a prediction direction close to a horizontal direction. For example, referring to FIG. 17, when dy is 2^5, i.e., 32, dx may be set to 2, 5, 9, 13, 17, 21, 26, 32, −2, −5, −9, −13, −17, −21, −26, and −32 such that an interval between prediction directions close to a vertical direction is relatively narrow and an interval between prediction modes increases towards a prediction direction close to a horizontal direction.

Similarly, when dx has a fixed value of 2^n, an absolute value of dy may be set such that an interval between prediction directions close to a horizontal direction is narrow and an interval between prediction modes increases towards a prediction direction close to a horizontal direction. For example, referring to FIG. 18, when dx is 2^5, i.e., 32, dy may be set to 2, 5, 9, 13, 17, 21, 26, 32, −2, −5, −9, −13, −17, −21, −26, and −32 such that an interval between prediction directions close to a horizontal direction is relatively narrow and an interval between prediction modes increase towards a prediction direction close to a vertical direction.

Also, when one of values of dx and dy is fixed, the other value may be set such as to increase according to prediction modes. For example, when the value of dy is fixed, an interval between values of dx may be set to increase by a predetermined value. Such an increment may be set according to angles divided between a horizontal direction and a vertical direction. For example, when dy is fixed, dx may have an increment a in a section where an angle with a vertical axis is smaller than 15°, an increment b in a section where the angle is between 15° and 30°, and an increment c in a section where the angle is higher than 30°.

For example, prediction modes having directivities of tan^−1(dy/dx) using (dx, dy) may be defined by (dx, dy) parameters shown in Tables 3 through 5.

TABLE 3

| dx  | dy | dx | dy  | dx | dy |
|-----|----|----|-----|----|----|
| −32 | 32 | 21 | 32  | 32 | 13 |
| −26 | 32 | 26 | 32  | 32 | 17 |
| −21 | 32 | 32 | 32  | 32 | 21 |
| −17 | 32 | 32 | −26 | 32 | 26 |
| −13 | 32 | 32 | −21 | 32 | 32 |
| −9  | 32 | 32 | −17 |    |    |
| −5  | 32 | 32 | −13 |    |    |
| −2  | 32 | 32 | −9  |    |    |
| 0   | 32 | 32 | −5  |    |    |
| 2   | 32 | 32 | −2  |    |    |
| 5   | 32 | 32 | 0   |    |    |
| 9   | 32 | 32 | 2   |    |    |
| 13  | 32 | 32 | 5   |    |    |
| 17  | 32 | 32 | 9   |    |    |

TABLE 4

| dx  | dy | dx | dy  | dx | dy |
|-----|----|----|-----|----|----|
| −32 | 32 | 19 | 32  | 32 | 10 |
| −25 | 32 | 25 | 32  | 32 | 14 |
| −19 | 32 | 32 | 32  | 32 | 19 |
| −14 | 32 | 32 | −25 | 32 | 25 |
| −10 | 32 | 32 | −19 | 32 | 32 |
| −6  | 32 | 32 | −14 |    |    |
| −3  | 32 | 32 | −10 |    |    |
| −1  | 32 | 32 | −6  |    |    |
| 0   | 32 | 32 | −3  |    |    |
| 1   | 32 | 32 | −1  |    |    |
| 3   | 32 | 32 | 0   |    |    |
| 6   | 32 | 32 | 1   |    |    |
| 10  | 32 | 32 | 3   |    |    |
| 14  | 32 | 32 | 6   |    |    |

TABLE 5

| dx  | dy | dx | dy  | dx | dy |
|-----|----|----|-----|----|----|
| −32 | 32 | 23 | 32  | 32 | 15 |
| −27 | 32 | 27 | 32  | 32 | 19 |
| −23 | 32 | 32 | 32  | 32 | 23 |
| −19 | 32 | 32 | −27 | 32 | 27 |
| −15 | 32 | 32 | −23 | 32 | 32 |
| −11 | 32 | 32 | −19 |    |    |
| −7  | 32 | 32 | −15 |    |    |
| −3  | 32 | 32 | −11 |    |    |
| 0   | 32 | 32 | −7  |    |    |
| 3   | 32 | 32 | −3  |    |    |
| 7   | 32 | 32 | 0   |    |    |
| 11  | 32 | 32 | 3   |    |    |
| 15  | 32 | 32 | 7   |    |    |
| 19  | 32 | 32 | 11  |    |    |

As described above, the intra prediction modes using (dx, dy) parameters use the adjacent left pixel (−1, i+j*dy/dx) or the adjacent upper pixel (j+i*dx/dy,−1) as a predictor of a pixel located at (j,i). When at least one of dx and dy has a power of 2 as shown in Table 2, locations of the adjacent left pixel (−1, i+j*dy/dx) and adjacent upper pixel (j+i*dx/dy,−1) may be obtained via only multiplication and shift operations without a division operation. When dx is 2^n, i.e., 32, in (dx, dy) as shown in Table 2, a division operation using dx may be replaced by a right shift operation, and thus a location of an adjacent left pixel may be obtained without a division operation based on (i*dy)>>n. Similarly, when dy is 2^m, i.e., 32, in (dx, dy) as shown in Table 2, a division operation using dx may be replaced by a right shift operation, and thus a location of an adjacent upper pixel may be obtained without a division operation based on (i*dx)>>m.

Figure 19:
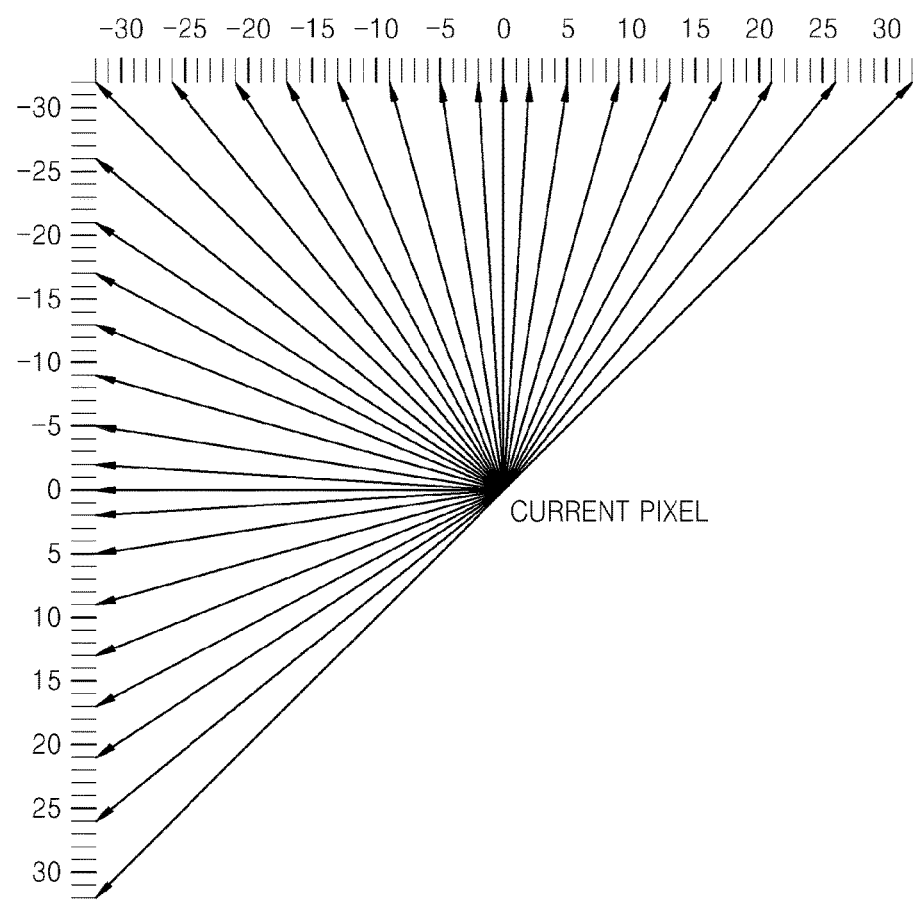
FIG. 19 is a diagram showing directions of an intra prediction mode having 33 directivities, according to an exemplary embodiment.

FIG. 19 is a diagram showing directions of an intra prediction mode having 33 directivities, according to an exemplary embodiment.

The intra predictors 410 and 550 may determine an adjacent pixel to be used as a predictor of a current pixel according to intra prediction modes having 33 directivities shown in FIG. 19. As described above, directions of intra prediction modes may be set such that an interval between prediction modes decreases towards a horizontal or vertical direction and increases farther from a vertical or horizontal direction.

Figure 20A:
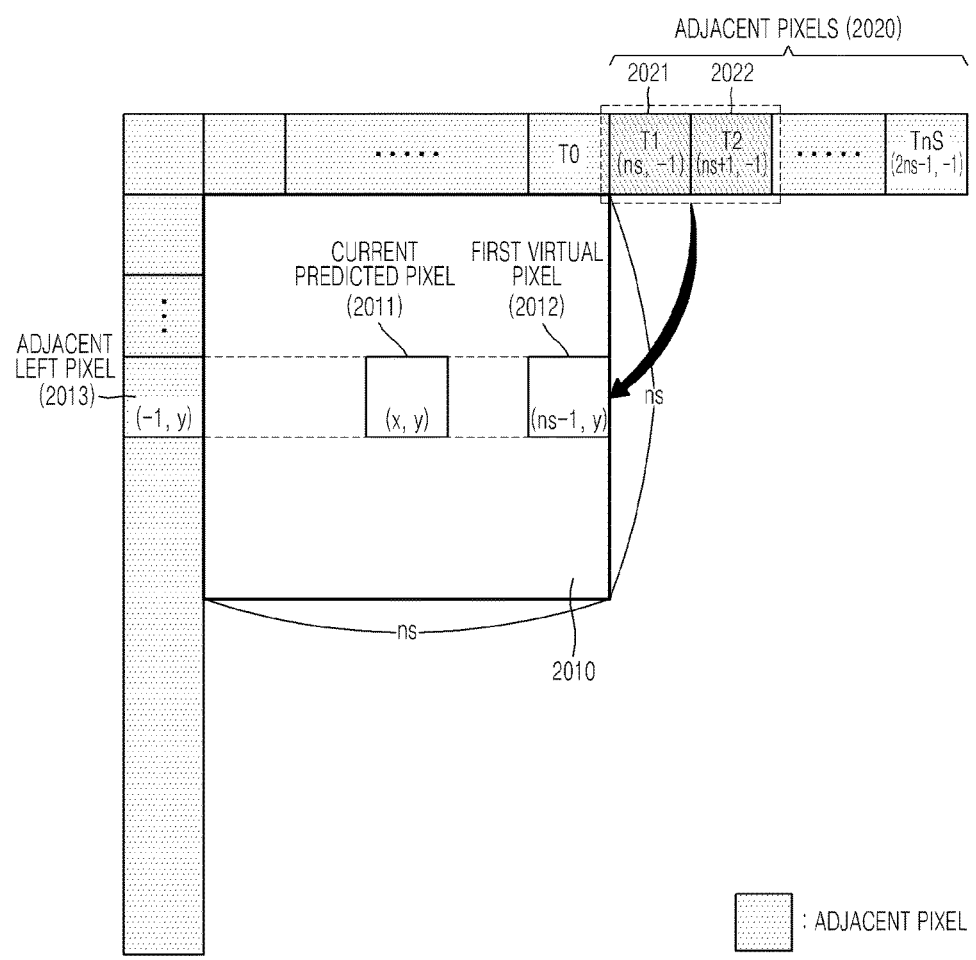
FIGS. 20A and 20B are diagrams for describing a planar mode according to exemplary embodiments.
Figure 20B:
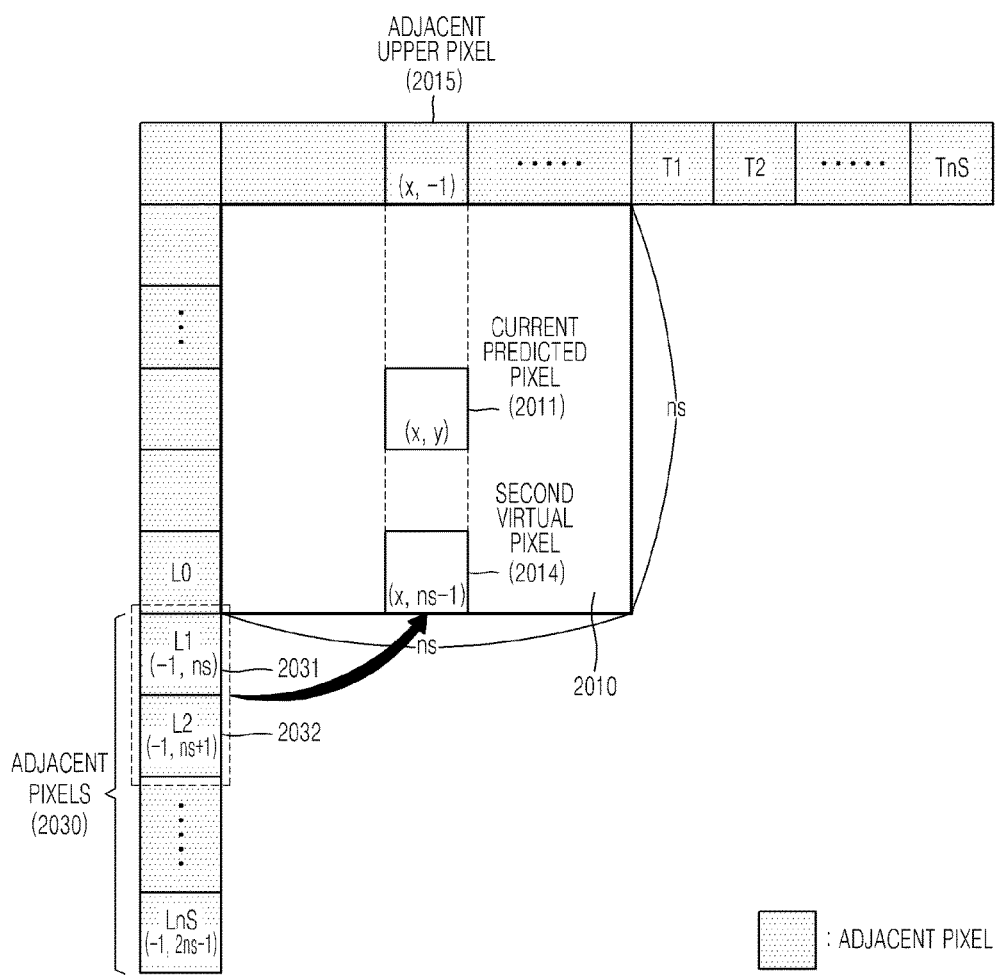

FIGS. 20A and 20B are diagrams for describing a planar mode according to exemplary embodiments.

As described above, the intra predictors 410 and 550 generate, in a planar mode, a virtual pixel used in linear interpolation in a horizontal direction by using at least one adjacent pixel located upper right to a current prediction unit and generates a virtual pixel used in linear interpolation in a vertical direction by using at least one adjacent pixel located lower left to the current prediction unit. Also, the intra predictors 410 and 550 generate a prediction value of a current pixel by using an average value of two predictors generated via linear interpolation in horizontal and vertical directions using the virtual pixels and adjacent pixels.

Referring to FIG. 20A, the intra predictors 410 and 550 obtain a first virtual pixel 2012 located on the same line as a current predicted pixel 2011 in a current prediction unit 2010 and corresponding to a pixel located farthest right of the current prediction unit 2010 by using at least one adjacent pixel 2020 located upper right to the current prediction unit 2010. The number of adjacent pixels 2020 used to obtain the first virtual pixel 2012 may be pre-determined. For example, the intra predictors 410 and 550 may determine a value generated by using an average value or weighted average value of a T1 2021 and a T2 2022, which are initial two upper right adjacent pixels, as the first virtual pixel 2012.

Also, the intra predictors 410 and 550 may determine the number of adjacent pixels 2020 used to obtain the first virtual pixel 2012 based on the size of the current prediction unit 2010. For example, when the size of the current prediction unit 2010 is nS×nS wherein nS is an integer, the intra predictors 410 and 550 may select nS/($2^m$) upper right adjacent pixels from among the adjacent pixels 2020 used to obtain the first virtual pixel 2012, wherein m is in integer satisfying a condition that $2^m$ is not higher than nS, and obtain the first virtual pixel 2012 by using an average value or weighted average value of the selected upper right adjacent pixels. In other words, the intra predictors 410 and 550 may select nS/2, nS/4, nS/8, and so on, pixels from among the adjacent pixels 2020. For example, when the size of the current prediction unit 2010 is 32×32, the intra predictors 410 and 550 may select 32/2, 32/4, 32/8, 32/16, 32/32, i.e., 1 to 16 upper right adjacent pixels.

Similarly, referring to FIG. 20B, the intra predictors 410 and 550 obtains a second virtual pixel 2014 located on the same column as the current predicted pixel 2011 in the current prediction unit 2010 and corresponding to a pixel located farthest below the current prediction unit 2010 by using at least one adjacent pixel 2030 located lower left to the current prediction unit 2010. The number of adjacent pixels 2030 used to obtain the second virtual pixel 2014 may be pre-determined. For example, a value generated by using an average value or weighted average value of L1 2031 and L2 2032, which are two initial lower left adjacent pixels, may be determined as the second virtual pixel 2014.

Also, the intra predictors 410 and 550 may determine the number of adjacent pixels 2030 used to obtain the second virtual pixel 2014 based on the size of the current prediction unit 2010. As described above, when the size of the current prediction unit 2010 is nS×nS wherein nS is an integer, the intra predictors 410 and 550 may select nS/($2^m$) lower left adjacent pixels from among the adjacent pixels 2030 used to obtain the second virtual pixel 2014, wherein m is an integer satisfying a condition that $2^m$ is not higher than nS, and obtain the second virtual pixel 2014 by using an average value or weighted average value of the selected lower left adjacent pixels.

Meanwhile, if the adjacent pixels 2020 are not usable by being included in a prediction unit encoded after the current prediction unit 2010, the intra predictors 410 and 550 may use a pixel T0 immediately left of the adjacent pixels 2020 as the first virtual pixel 2012. On the other hand, if the adjacent pixels 2030 are not usable by being included in a prediction unit encoded after the current prediction unit 2010, the intra predictors 410 and 550 may use a pixel L0 immediately above the adjacent pixels 2030 as the second virtual pixel 2014.

Referring back to FIG. 20A, the intra predictors 410 and 550 generate a first prediction value p1 of the current predicted pixel 2011 by performing linear interpolation using a geometric average value considering a distance between the current predicted pixel 2011 and the first virtual pixel 2012 obtained from the adjacent pixels 2020 and a distance between the current predicted pixel 2011 and an adjacent left pixel 2013 on the same line as the current predicted pixel 2011.

When a pixel value of the adjacent left pixel 2013 is rec(−1,y), a pixel value of the first virtual pixel 2012 located at (nS−1,y) is T wherein T is a real number, and a prediction value of the current predicted pixel 2011 is p(x,y) wherein x,y=0 to nS−1, wherein (x,y) denotes a location of the current predicted pixel 2011 of the current prediction unit 2010 and rec(x,y) denotes adjacent pixels of the current prediction unit 2010 wherein (x,y=−1 to 2*nS−1), a first prediction value p1(x,y) may be obtained according to an equation p1(x,y)=(nS−1−x)*rec(−1,y)+(x+1)*T. Here, (ns−1−x) corresponds to a distance between the current predicted pixel 2011 and the first virtual pixel 2012 and (x+1) corresponds to a distance between the current predicted pixel 2011 and the adjacent left pixel 2013. As such, the intra predictors 410 and 550 generate the first prediction value p1 through linear interpolation using the distance between the first virtual pixel 2012 and the current predicted pixel 2011, the distance between the current predicted pixel 2011 and the adjacent left pixel 2013 on the same line as the current predicted pixel 2011, the pixel value of the first virtual pixel 2012, and the pixel value of the adjacent left pixel 2013.

Referring back to FIG. 20B, the intra predictors 410 and 550 generate a second prediction value p2 of the current predicted pixel 2011 by performing linear interpolation using a geometric average value considering a distance between the current predicted pixel 2011 and the second virtual pixel 2014 obtained from the adjacent pixels 2030 and a distance between the current predicted pixel 2011 and an adjacent upper pixel 2015 on the same column as the current predicted pixel 2011.

When a pixel value of the adjacent upper pixel 2015 is rec(x,−1), a pixel value of the second virtual pixel 2014 located at (x,nS−1) is L wherein L is a real number, and a prediction value of the current predicted pixel 2011 is p(x,y) wherein x,y=0 to nS−1, wherein (x,y) denotes a location of the current predicted pixel 2011 of the current prediction unit 2010 and rec(x,y) denotes adjacent pixels of the current prediction unit 2010 wherein (x,y=−1 to 2*nS−1), a second prediction value p2(x,y) may be obtained according to an equation p2(x,y)=(nS−1−y)*rec(x,−1)+(y+1)*L. Here, (ns−1−y) corresponds to a distance between the current predicted pixel 2011 and the second virtual pixel 2014 and (y+1) corresponds to a distance between the current predicted pixel 2011 and the adjacent upper pixel 2015. As such, the intra predictors 410 and 550 generate the second prediction value p2 through linear interpolation using the distance between the second virtual pixel 2014 and the current predicted pixel 2011, the distance between the current predicted pixel 2011 and the adjacent upper pixel 2015 on the same column as the current predicted pixel 2011, the pixel value of the second virtual pixel 2014, and the pixel value of the adjacent upper pixel 2015.

As such, when the first prediction value p1(x,y) and the second prediction value p2(x,y) are obtained via the linear interpolation in horizontal and vertical directions, the intra predictors 410 and 550 obtains the prediction value p(x,y) of the current predicted pixel 2011 by using an average value of the first prediction value p1(x,y) and the second prediction value p2(x,y). In detail, the intra predictors 410 and 550 may obtain the prediction value p(x,y) of the current predicted pixel 2011 by using an equation P(x,Y)={P1(x,y)+p2(x,y)+nS}>>(k+1), wherein k is $\log_2 nS$.

Alternatively, the intra predictors 410 and 550 may obtain a first virtual pixel and a second virtual pixel by using a filtered adjacent upper right pixel and a filtered adjacent lower left pixel instead of using an adjacent upper right pixel and an adjacent lower left pixel as they are.

FIG. 21 is a diagram showing adjacent pixels 2110 and 2120 that are filtered around a current prediction unit 2100, according to an exemplary embodiment.

Referring to FIG. 21, the intra predictors 410 and 550 generate filtered adjacent pixels by performing filtering at least once on the X adjacent pixels 2110 above the current prediction unit 2100 that is currently intra predicted and Y adjacent pixels 2120 to the left of the current prediction unit 2100. Here, when a size of the current prediction unit 2100 is nS×nS, X may be 2nS and Y may be 2nS.

When ContextOrg[n] denotes X+Y original adjacent pixels above and left of the current prediction unit 2100 having the size of nS×nS, wherein n is an integer from 0 to X+Y−1, n is 0 in an adjacent lowest pixel from among the adjacent left pixels, i.e., ContextOrg[0] and n is X+Y−1 in an adjacent rightmost pixel from among the adjacent upper pixels, i.e., ContextOrg[X+Y−1].

Figure 22:
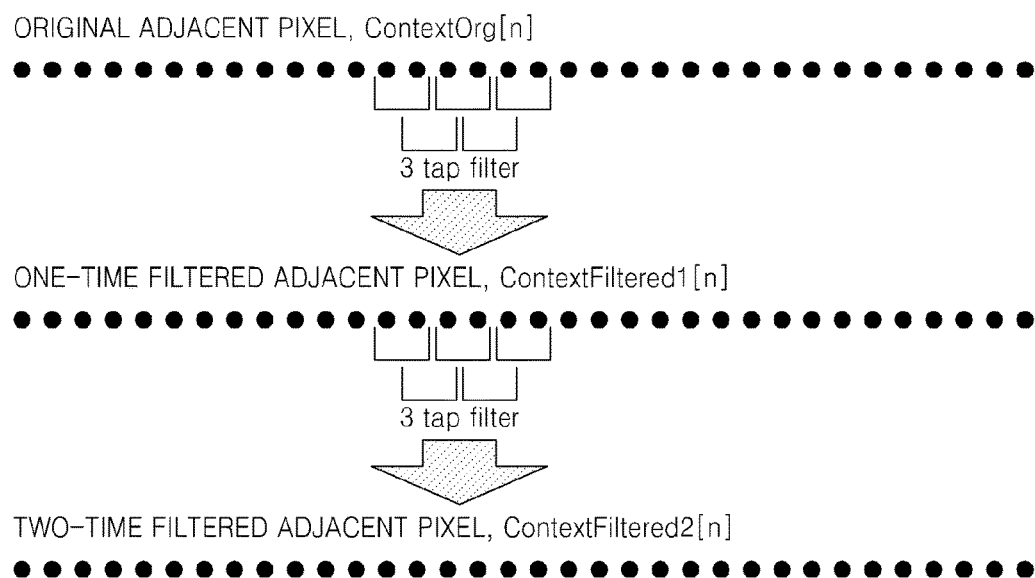
FIG. 22 is a reference diagram for describing a filtering process of an adjacent pixel.

FIG. 22 is a reference diagram for describing a filtering process of an adjacent pixel.

Referring to FIG. 22, when ContextOrg[n] denotes original adjacent pixels above and left of a current prediction unit, wherein n is an integer from 0 to 4nS−1, the original adjacent pixels may be filtered via a weighted average value between the original adjacent pixels. When ContextFiltered1[n] denotes a one-time filtered adjacent pixel, adjacent pixels filtered by applying a 3-tap filter to the original adjacent pixels ContextOrg[n] may be obtained according to an equation ContextFiltered1[n]=(ContextOrg[n−1]+2*ContextOrg[n]+ContextOrg[n+1])/4. Similarly, a two-time filtered adjacent pixel ContextFiltered2[n] may be generated by again calculating a weighted average value between the one-time filtered adjacent pixels ContextFiltered1[n]. For example, adjacent pixels filtered by applying a 3-tap filter to the filtered adjacent pixels ContextFiltered1[n] may be generated according to an equation ContextFiltered2 [n]=(ContextFiltered1[n−1]+2*ContextFiltered1 [n]+ContextFiltered1[n+1])/4.

Alternatively, adjacent pixels may be filtered by using any one of various methods, and then as described above, the intra predictors 410 and 550 may obtain a first virtual pixel from at least one adjacent filtered upper right pixel, obtain a second virtual pixel from at least one adjacent filtered lower left pixel, and then generate a prediction value of a current pixel via linear interpolation as described above. Use of adjacent filtered pixels may be determined based on a size of a current prediction unit. For example, the adjacent filtered pixels may be used only when the size of the current prediction unit is equal to or larger than 16×16.

FIG. 23 is a flowchart illustrating an intra prediction method according to a planar mode, according to an exemplary embodiment.

In operation 2310, the intra predictors 410 and 550 obtain a first virtual pixel located on the same line as a current predicted pixel of a current prediction unit and corresponding to a pixel located farthest right of the current prediction pixel, by using at least one adjacent pixel located upper right of the current prediction unit. As described above, a number of adjacent pixels used to obtain the first virtual pixel may be pre-determined or determined based on a size of the current prediction unit.

In operation 2320, the intra predictors 410 and 550 obtain a second virtual pixel located on the same column as the current predicted pixel and corresponding to a pixel located farthest below the current prediction unit by using at least one adjacent pixel located lower left to the current prediction unit. As described above, a number of adjacent pixels used to obtain the second virtual pixel may be pre-determined or determined based on the size of the current prediction unit.

In operation 2330, the intra predictors 410 and 550 obtain a first prediction value of the current predicted pixel via linear interpolation using the first virtual pixel and an adjacent left pixel located on the same line as the current predicted pixel. As described above, when a location of the current predicted pixel is (x,y) wherein x and y is each from 0 to nS−1, an adjacent pixel of the current prediction unit is rec(x,y) wherein x and y is each from −1 to 2*nS−1, a pixel value of an adjacent left pixel is rec(−1,y), a pixel value of the first virtual pixel located at (nS−1,y) is T wherein T is a real number, and a prediction value of the current predicted pixel is p(x,y) wherein x and y is each from 0 to nS−1, the first prediction value p1(x,y) may be obtained according to an equation p1(x,y), (nS−1−x)*rec(−1,y)+(x+1)*T.

In operation 2340, the intra predictors 410 and 550 obtain a second prediction value of the current predicted pixel via linear interpolation using the second virtual pixel and an adjacent upper pixel located on the same column as the current predicted pixel. When a pixel value of the adjacent upper pixel is rec(x,−1) and a pixel value of the second virtual pixel located at (x,nS−1) is L wherein L is a real number, the second prediction value p2(x,y) may be obtained according to an equation p2(x,y), (nS−1−y)*rec(x,−1)+(y+1)*L.

In operation 2350, the intra predictors 410 and 550 obtain a prediction value of the current predicted pixel by using the first and second prediction values. As described above, when the first and second prediction values p1(x,y) and p2(x, y) are obtained via the linear interpolation in horizontal and vertical directions, the intra predictors 410 and 550 obtain the prediction value p(x,y) of the current predicted pixel by using an average value of the first and second prediction values p1(x,y) and p2(x,y). In detail, the intra predictors 410 and 550 may obtain the prediction value p(x,y) according to an equation P(x,Y)={p1($x,y$)+p2($x,y$)+nS}>>(k+1) wherein k is $\log_2 nS$).

According to one or more exemplary embodiments, encoding efficiency of an image can be improved by applying an optimum intra prediction method according to image characteristics via various intra prediction methods using adjacent pixels.

One or more exemplary embodiments may be written as computer programs and may be implemented in general-use digital computers that execute the programs by using a computer readable recording medium. Examples of the computer readable recording medium include magnetic storage media (e.g., ROM, floppy disks, hard disks, etc.), optical recording media (e.g., CD-ROMs, or DVDs), and storage media. Moreover, one or more of the above-described elements can include a processor or microprocessor executing a computer program stored in a computer-readable medium While exemplary embodiments have been particularly shown and described above, it will be understood by those of ordinary skill in the art that various changes in form and details may be made therein without departing from the spirit and scope of the inventive concept as defined by the appended claims. Exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention.

What is claimed is:

1. A method of intra predicting an image, the method comprising:
   acquiring prediction mode information indicating one selected from a group comprising an inter mode and an intra mode, and intra prediction mode information indicating one selected from a group comprising directional prediction modes and a planar mode from a bitstream;
   determining a prediction mode of a current block according to the prediction mode information and the intra prediction mode information;
   acquiring reference samples including a first corner sample, a second corner sample, a first side sample, and a second side sample, the reference samples used for prediction of a current sample; and
   determining a prediction value of the current sample based on a weighted sum of sample values of the first corner sample, the second corner sample, the first side sample, and the second side sample, if the prediction mode of the current block is determined to be the planar mode,
   wherein,
   the first corner sample is located at an intersection of a row adjacent to an upper side of the current block and a column adjacent to a right side of the current block,
   the second corner sample is located at an intersection of a row adjacent to a lower side of the current block and a column adjacent to a left side of the current block,
   the first side sample is located at an intersection of a row in which the current sample is located and a column adjacent to the left side of the current block, and
   the second side sample is located at an intersection of the row adjacent to the upper side of the current block and a column in which the current sample is located,
   wherein,
   a weight for the first corner sample is determined based on a horizontal distance between the current sample and the first side sample,
   a weight for the second corner sample is determined based on a vertical distance between the current sample and the second side sample,
   a weight for the first side sample is determined based on a distance less than a horizontal distance between the current sample and the first corner sample, and
   a weight for the second side sample is determined based on a distance less than a vertical distance between the current sample and the second corner sample.

2. The method of claim 1, wherein the image is split into a plurality of maximum coding units, according to information about a maximum size of a coding unit,
   a maximum coding unit is hierarchically split into one or more coding units of depth including at least one of a current depth and a lower depth, according to split information,
   when the split information indicates a split for the current depth, the coding unit of the current depth is split into four square coding units of a lower depth, independently from neighboring coding units,
   when the split information indicates a non-split of the current depth, at least one transform unit is obtained from the coding unit of the current depth, and
   the current block is one of the at least one transform unit.

3. An encoding method for intra predicting an image, the encoding method comprising:
   determining prediction mode information indicating one selected from a group comprising an inter mode and an intra mode, and intra prediction mode information indicating one selected from a group comprising directional prediction modes and a planar mode;
   acquiring reference samples including a first corner sample, a second corner sample, a first side sample, and a second side sample, the reference samples used for prediction of a current sample;
   determining a prediction value of the current sample to be a weighted sum of sample values of the first corner sample, the second corner sample, the first side sample, and the second side sample, if a prediction mode of a current block is determined to be the planar mode;
   determining residual data indicating a difference between an original value and the prediction value of the current sample; and
   outputting a bitstream including the prediction mode information, the intra prediction mode information and the residual data,
   the first corner sample is located at an intersection of a row to an upper side of the current block and a column to a right side of the current block,
   the second corner sample is located at an intersection of a row to a lower side of the current block and a column to a left side of the current block,
   the first side sample is located at an intersection of a row in which the current sample is located and the column to the left side of the current block,
   the second side sample is located at an intersection of the row to the upper side of the current block and a column in which the current sample is located,
   the current block is predicted by determining prediction values for samples included in the current block,
   weights for the weighted sum are determined based on a relative location of the current sample to the current block,
   a weight for the first corner sample is determined based on a horizontal distance between the current sample and the first side sample, a weight for the second corner sample is determined based on a vertical distance between the current sample and the second side sample, a weight for the first side sample is determined based on a distance less than a horizontal distance between the current sample and the first corner sample, a weight for the second side sample is determined based on a distance less than a vertical distance between the current sample and the second corner sample.

4. A non-transitory computer-readable recording medium having embodied thereon computer-readable codes, which when executed by a processor of an encoder causes the encoder to execute a method of encoding an image, the method comprising:

generating a bitstream comprising:

prediction mode information indicating one selected from a group comprising an inter mode and an intra mode for a current block;

intra prediction mode information indicating one selected from a group comprising directional prediction modes and a planar mode for the current block; and residual data indicating a difference between an original value and a prediction value of a current sample in the current block, wherein, when the prediction mode information indicates the intra mode and the intra prediction mode information indicates the planar mode, the prediction value of the current sample is determined based on a weighted sum of a first corner sample, a second corner sample, a first side sample, and a second side sample, when the prediction mode information indicates the intra mode and the intra prediction mode information indicates a directional prediction mode, the prediction value of the current sample is determined based on a reference sample indicated by a direction of the directional prediction mode, the first corner sample is located at an intersection of a row to an upper side of the current block and a column to a right side of the current block, the second corner sample is located at an intersection of a row to a lower side of the current block and a column to a left side of the current block, the first side sample is located at an intersection of a row in which the current sample is located and the column to the left side of the current block, the second side sample is located at an intersection of the row to the upper side of the current block and a column in which the current sample is located, weights for the weighted sum are determined based on a relative location of the current sample to the current block, a weight for the first corner sample is determined based on a horizontal distance between the current sample and the first side sample, a weight for the second corner sample is determined based on a vertical distance between the current sample and the second side sample, a weight for the first side sample is determined based on a distance less than a horizontal distance between the current sample and the first corner sample, a weight for the second side sample is determined based on a distance less than a vertical distance between the current sample and the second corner sample.

* * * * *